(12) United States Patent
Gerhart et al.

(10) Patent No.: US 10,785,154 B2
(45) Date of Patent: Sep. 22, 2020

(54) MANAGING PHYS OF A DATA STORAGE TARGET DEVICE

(71) Applicant: Western Digital Technologies, Inc., San Jose, CA (US)

(72) Inventors: Darin Edward Gerhart, Oronoco, MN (US); Nicholas Edward Ortmeier, Rochester, MN (US); Xin Chen, Rochester, MN (US)

(73) Assignee: WESTERN DIGITAL TECHNOLOGIES, INC. CA (US)

( * ) Notice: Subject to any disclaimer, the term of this patent is extended or adjusted under 35 U.S.C. 154(b) by 0 days.

(21) Appl. No.: 16/564,654

(22) Filed: Sep. 9, 2019

(65) Prior Publication Data

US 2019/0394127 A1 Dec. 26, 2019

Related U.S. Application Data

(63) Continuation of application No. 15/599,937, filed on May 19, 2017, now Pat. No. 10,425,333.

(51) Int. Cl.
*G06F 3/06* (2006.01)
*H04L 12/741* (2013.01)
*G06F 13/40* (2006.01)

(52) U.S. Cl.
CPC .......... *H04L 45/745* (2013.01); *G06F 3/0604* (2013.01); *G06F 3/0632* (2013.01); *G06F 3/0658* (2013.01); *G06F 3/0679* (2013.01); *G06F 13/409* (2013.01); *G06F 3/0614* (2013.01)

(58) Field of Classification Search
CPC .............................. G06F 3/0614; G06F 3/0632
See application file for complete search history.

(56) References Cited

U.S. PATENT DOCUMENTS

| | | | |
|---|---|---|---|
| 7,584,319 B1 | 9/2009 | Liao et al. | |
| 7,673,185 B2 | 3/2010 | Kalwitz et al. | |
| 7,912,995 B1 | 3/2011 | Long et al. | |
| 8,843,666 B2 | 9/2014 | Besmer et al. | |
| 8,924,751 B2 | 12/2014 | Myrah et al. | |
| 8,959,374 B2 | 2/2015 | Miller et al. | |
| 2005/0138202 A1* | 6/2005 | Seto .................. | H04L 29/06 709/238 |
| 2007/0093124 A1 | 4/2007 | Varney et al. | |
| 2014/0156878 A1 | 6/2014 | Hameed et al. | |
| 2015/0006814 A1 | 1/2015 | Phong et al. | |
| 2018/0165031 A1 | 6/2018 | Tomaszewski et al. | |

* cited by examiner

*Primary Examiner* — Zachary K Huson
(74) *Attorney, Agent, or Firm* — Patterson & Sheridan, LLP; Steven Versteeg (57) ABSTRACT

Embodiments of the present disclosure generally relate to managing phys of a data storage target device. In one embodiment, a method of managing phys of a data storage target device includes waiting to receive a host address on a target phy and transmitting a target phy address for the target phy after waiting to receive the host address on the target phy. In another embodiment, a method of managing phys of a data storage target device includes configuring a target port comprising a first target phy and reconfiguring the target port comprising a first target phy and a second target phy.

20 Claims, 9 Drawing Sheets

| PHY SAS ADDRESS LOOKUP TABLE | | | |
|---|---|---|---|
| PHY | HOST RCVD IDENTIFY SAS ADDRESS | DEFAULT TARGET PHY SAS ADDRESS | LAST TARGET SAS ADDRESS |
| 0 | | 50 00 C0 A0 52 76 18 00 — 311 | |
| 1 | | 50 00 C0 A0 52 76 18 01 — 312 | |
| 2 | | 50 00 C0 A0 52 76 18 02 — 313 | |
| 3 | | 50 00 C0 A0 52 76 18 03 — 314 | |

| PHY SAS ADDRESS LOOKUP TABLE | | | |
|---|---|---|---|
| PHY | HOST RCVD IDENTIFY SAS ADDRESS | DEFAULT TARGET PHY SAS ADDRESS | LAST TARGET PHY SAS ADDRESS |
| 0 | 50 08 80 17 83 08 89 91 — 321 | 50 00 C0 A0 52 76 18 00 — 311 | 50 00 C0 A0 52 76 18 00 — 331 |
| 1 | | 50 00 C0 A0 52 76 18 01 | |
| 2 | | 50 00 C0 A0 52 76 18 02 | |
| 3 | | 50 00 C0 A0 52 76 18 03 | |

| PHY SAS ADDRESS LOOKUP TABLE ||||
|---|---|---|---|
| PHY | HOST RCVD IDENTIFY SAS ADDRESS | DEFAULT TARGET PHY SAS ADDRESS | LAST TARGET PHY SAS ADDRESS |
| 0 | 50 08 80 17 83 08 89 91 | 50 00 C0 A0 52 76 18 00 | 50 00 C0 A0 52 76 18 00 |
| 1 | 50 13 22 61 38 02 12 50 | 50 00 C0 A0 52 76 18 01 | 50 00 C0 A0 52 76 18 01 |
| 2 |  | 50 00 C0 A0 52 76 18 02 |  |
| 3 |  | 50 00 C0 A0 52 76 18 03 |  |

321 → row 0; 322 → row 1; 331 → row 0 last; 332 → row 1 last; 312

| PHY SAS ADDRESS LOOKUP TABLE ||||
|---|---|---|---|
| PHY | HOST RCVD IDENTIFY SAS ADDRESS | DEFAULT TARGET PHY SAS ADDRESS | LAST TARGET PHY SAS ADDRESS |
| 0 | 50 08 80 17 83 08 89 91 | 50 00 C0 A0 52 76 18 00 | 50 00 C0 A0 52 76 18 00 |
| 1 | 50 13 22 61 38 02 12 50 | 50 00 C0 A0 52 76 18 01 | 50 00 C0 A0 52 76 18 01 |
| 2 | 50 08 80 17 83 08 89 91 | 50 00 C0 A0 52 76 18 02 | 50 00 C0 A0 52 76 18 00 |
| 3 |  | 50 00 C0 A0 52 76 18 03 |  |

| PHY SAS ADDRESS LOOKUP TABLE | | | |
|---|---|---|---|
| PHY | HOST RCVD IDENTIFY SAS ADDRESS | DEFAULT TARGET PHY SAS ADDRESS | LAST TARGET PHY SAS ADDRESS |
| 0 | 50 08 80 17 83 08 89 91 | 50 00 C0 A0 52 76 18 00 | 50 00 C0 A0 52 76 18 00 |
| 1 | 50 13 22 61 38 02 12 50 | 50 00 C0 A0 52 76 18 01 | 50 00 C0 A0 52 76 18 01 |
| 2 | 50 08 80 17 83 08 89 91 | 50 00 C0 A0 52 76 18 02 | 50 00 C0 A0 52 76 18 00 |
| 3 | 50 08 80 17 83 09 89 91 | 50 00 C0 A0 52 76 18 03 | 50 00 C0 A0 52 76 18 00 |

321 — row 0; 323 — row 2; 324 — row 3; 331, 333, 334 — last target column

| PHY SAS ADDRESS LOOKUP TABLE ||||
|---|---|---|---|
| PHY | HOST RCVD IDENTIFY SAS ADDRESS | DEFAULT TARGET PHY SAS ADDRESS | LAST TARGET PHY SAS ADDRESS |
| 0 | 50 08 80 17 83 08 89 91 | 50 00 C0 A0 52 76 18 00 | 50 00 C0 A0 52 76 18 00 |
| 1 |  | 50 00 C0 A0 52 76 18 01 |  |
| 2 |  | 50 00 C0 A0 52 76 18 02 |  |
| 3 |  | 50 00 C0 A0 52 76 18 03 |  |

| PHY SAS ADDRESS LOOKUP TABLE ||||
|---|---|---|---|
| PHY | HOST RCVD IDENTIFY SAS ADDRESS | DEFAULT TARGET PHY SAS ADDRESS | LAST TARGET PHY SAS ADDRESS |
| 0 | 50 08 80 17 83 08 89 91 | 50 00 C0 A0 52 76 18 00 | 50 00 C0 A0 52 76 18 00 |
| 1 | 50 08 80 17 83 08 89 91 | 50 00 C0 A0 52 76 18 01 | 50 00 C0 A0 52 76 18 00 |
| 2 |  | 50 00 C0 A0 52 76 18 02 |  |
| 3 |  | 50 00 C0 A0 52 76 18 03 |  |

| PHY SAS ADDRESS LOOKUP TABLE | | | |
|---|---|---|---|
| PHY | HOST RCVD IDENTIFY SAS ADDRESS | DEFAULT TARGET PHY SAS ADDRESS | LAST TARGET PHY SAS ADDRESS |
| 0 | 50 08 80 17 83 08 89 91 | 50 00 C0 A0 52 76 18 00 | 50 00 C0 A0 52 76 18 00 |
| 1 | 50 08 80 17 83 08 89 91 | 50 00 C0 A0 52 76 18 01 | 50 00 C0 A0 52 76 18 00 |
| 2 | 50 08 80 17 83 08 89 91 | 50 00 C0 A0 52 76 18 02 | 50 00 C0 A0 52 76 18 02 |
| 3 | | 50 00 C0 A0 52 76 18 03 | |

| PHY SAS ADDRESS LOOKUP TABLE | | | |
|---|---|---|---|
| PHY | HOST RCVD IDENTIFY SAS ADDRESS | DEFAULT TARGET PHY SAS ADDRESS | LAST TARGET PHY SAS ADDRESS |
| 0 | 50 08 80 17 83 08 89 91 | 50 00 C0 A0 52 76 18 00 | 50 00 C0 A0 52 76 18 00 |
| 1 | 50 08 80 17 83 08 89 91 | 50 00 C0 A0 52 76 18 01 | 50 00 C0 A0 52 76 18 00 |
| 2 | 50 08 80 17 83 08 89 91 | 50 00 C0 A0 52 76 18 02 | 50 00 C0 A0 52 76 18 02 |
| 3 | 50 08 80 17 83 08 89 91 | 50 00 C0 A0 52 76 18 03 | 50 00 C0 A0 52 76 18 02 |

| PHY SAS ADDRESS LOOKUP TABLE ||||
|---|---|---|---|
| PHY | HOST RCVD IDENTIFY SAS ADDRESS | DEFAULT TARGET PHY SAS ADDRESS | LAST TARGET PHY SAS ADDRESS |
| 0 | | 50 00 C0 A0 52 76 18 00 | 50 00 C0 A0 52 76 18 01 |
| 1 | 50 08 80 17 83 08 89 91 | 50 00 C0 A0 52 76 18 01 | 50 00 C0 A0 52 76 18 01 |
| 2 | | 50 00 C0 A0 52 76 18 02 | |
| 3 | | 50 00 C0 A0 52 76 18 03 | |

| PHY SAS ADDRESS LOOKUP TABLE ||||
|---|---|---|---|
| PHY | HOST RCVD IDENTIFY SAS ADDRESS | DEFAULT TARGET PHY SAS ADDRESS | LAST TARGET PHY SAS ADDRESS |
| 0 | | 50 00 C0 A0 52 76 18 00 | 50 00 C0 A0 52 76 18 01 |
| 1 | 50 08 80 17 83 08 89 91 | 50 00 C0 A0 52 76 18 01 | 50 00 C0 A0 52 76 18 01 |
| 2 | | 50 00 C0 A0 52 76 18 02 | |
| 3 | 50 13 22 61 38 02 12 50 | 50 00 C0 A0 52 76 18 03 | 50 00 C0 A0 52 76 18 03 |

| PHY SAS ADDRESS LOOKUP TABLE | | | |
|---|---|---|---|
| PHY | HOST RCVD IDENTIFY SAS ADDRESS | DEFAULT TARGET PHY SAS ADDRESS | LAST TARGET PHY SAS ADDRESS |
| 0 | | 50 00 C0 A0 52 76 18 00 | 50 00 C0 A0 52 76 18 01 |
| 1 | 50 08 80 17 83 08 89 91 | 50 00 C0 A0 52 76 18 01 | 50 00 C0 A0 52 76 18 01 |
| 2 | 50 13 22 61 38 02 12 50 | 50 00 C0 A0 52 76 18 02 | 50 00 C0 A0 52 76 18 03 |
| 3 | 50 13 22 61 38 02 12 50 | 50 00 C0 A0 52 76 18 03 | 50 00 C0 A0 52 76 18 03 |

| PHY SAS ADDRESS LOOKUP TABLE | | | |
|---|---|---|---|
| PHY | HOST RCVD IDENTIFY SAS ADDRESS | DEFAULT TARGET PHY SAS ADDRESS | LAST TARGET PHY SAS ADDRESS |
| 0 | 50 08 80 17 83 08 89 91 | 50 00 C0 A0 52 76 18 00 | 50 00 C0 A0 52 76 18 01 |
| 1 | 50 08 80 17 83 08 89 91 | 50 00 C0 A0 52 76 18 01 | 50 00 C0 A0 52 76 18 01 |
| 2 | 50 13 22 61 38 02 12 50 | 50 00 C0 A0 52 76 18 02 | 50 00 C0 A0 52 76 18 03 |
| 3 | 50 13 22 61 38 02 12 50 | 50 00 C0 A0 52 76 18 03 | 50 00 C0 A0 52 76 18 03 |

FIG. 5D

MANAGING PHYS OF A DATA STORAGE TARGET DEVICE

CROSS-REFERENCE TO RELATED APPLICATIONS

This application is a continuation of co-pending U.S. patent application Ser. No. 15/599,937, filed May 19, 2017, which is herein incorporated by reference.

BACKGROUND OF THE DISCLOSURE

Field of the Disclosure

Embodiments of the present disclosure generally relate to managing phys of a data storage target device.

Description of the Related Art

Host computing devices communicate with a target, such as a data storage device, through a port on the target. The target port includes one or more physical layers, which are known as phys. The physical layers are circuitry implementing the physical layer functions. With data storage devices using a SAS interface protocol, a narrow target port has a single phy while a wide target port has two or more phys. The target phys physically couple to other host phys through a physical link, such as a cable or optical fiber. The phys perform various functions using signals received and transmitted over the physical link for the port.

Target phy SAS addresses are typically manually configured via a vendor mode setting or a unique firmware for a particular user mandated configuration. The target phy SAS addresses are pre-defined to operate in a narrow port configuration or a wide port configuration. Mode setting or unique firmware approaches require manual intervention with a newly selected mode setting or a new firmware to update a change in the target configuration, such as when the target is moved between systems, when cabling changes occur to the target, or when an expander coupled to the target undergo a configuration change. Thus, manual intervention statically provides wide port configuration.

It is desirable for the target phys to be grouped in a wide port for improved link failure tolerance, for optimized data transfers, and for improved power management of the target phys. However, the SAS protocol does not provide a defined mechanism for how wide port links should be established on target phys. Hosts typically manage wide port configurations at initial power-on or boot time by presenting the target with common SAS addresses on each phy that host would like to configure in a wide port. If a target responds with a common SAS address on those phys as set by manual intervention, a wide port is established. If a target responds with different SAS addresses on those phys as per typical default settings, narrow ports are established.

Targets do not know which phys the host may attempt to group into a wide port. The host does not have any visibility to the target's phy prior usage or selection in a wide port. Therefore, there is a need for improved management of target phys into wide ports.

SUMMARY OF THE DISCLOSURE

Embodiments of the present disclosure generally relate to managing phys of a data storage target device.

In one embodiment, a method of automatically managing phys of a data storage target device by a controller of the data storage device across a link reset includes transmitting a common target phy address for a plurality of target phys during a first link reset, storing the common target phy address in a non-volatile memory of the data storage device, resetting the target phys, and transmitting the stored common target phy address for the plurality of target phys during a second link reset.

In one embodiment, a data storage device includes a controller, a plurality of phys, a non-volatile memory containing a lookup table, and a non-transitory computer readable storage medium containing instructions. The instructions when executed by the controller cause the controller to transmit a common phy address for the phys, store the common phy address in the lookup table, reset the phys, and transmit the stored common phy address. In another embodiment, the data storage device includes a controller, a port, a plurality of phys, and a means for automatically configuring the port into a wide port.

In another embodiment, a method of automatically managing phys of a data storage target device by a controller of the data storage device includes matching a received host address on a plurality of target phys and configuring the plurality of target phys into a wide port for the plurality of target phys with the matching received host address.

In another embodiment, a data storage device includes a controller, one or more ports, a plurality of phys, and a non-transitory computer readable storage medium containing instructions. The instructions when executed by the controller cause the controller to receive a setting for a maximum phy limit configured into a common port and configure the plurality of phys into the one or more ports without exceeding the setting of the maximum phy limit. In yet another embodiment, a data storage device includes a controller, one or more ports, a plurality of phys, and a means for configuring the plurality of phys into at least a wide port for phys having a matching received host address.

In still another embodiment, a method of managing phys of a data storage target device includes waiting to receive a host address on a target phy and transmitting a target phy address for the target phy after waiting to receive the host address on the target phy.

In still another embodiment, a data storage device includes a controller, a first phy and a second phy, a non-transitory computer readable storage medium containing instructions. The instructions when executed by the controller cause the controller to wait to receive a host address on the first phy and transmit a phy address for the first phy after waiting to receive the host address on the first phy. In one embodiment, a data storage device includes a controller, a plurality of phys, and a means for determining a phy address to transmit during a SAS identification window to configure the phys into a wide port configuration.

In one embodiment, a method of managing phys of a data storage target device includes configuring a target port comprising a first target phy and reconfiguring the target port comprising a first target phy and a second target phy.

In one embodiment, a data storage device includes a controller, a first phy and a second phy, a port, and a non-transitory computer readable storage medium containing instructions. The instructions when executed by the controller cause the controller to configure the port to comprise the first phy and reconfigure the port to comprise the first phy and the second phy. In still another embodiment, a data storage device includes a controller, one or more ports, a plurality of phys, and a means for configuring the plurality of phys into a configuration. The configuration selected from the group consisting of one of the following:

(1) four narrow ports, (2) two narrow ports and one wide port, (3) one narrow and one wide port, (4) two wide ports, and (5) one wide port.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

Embodiments of the present disclosure generally relate to port auto-configuration. More particularly, embodiments of the present disclosure relate to auto-configuration of target phys into narrow ports and/or wide ports.

Figure 1:
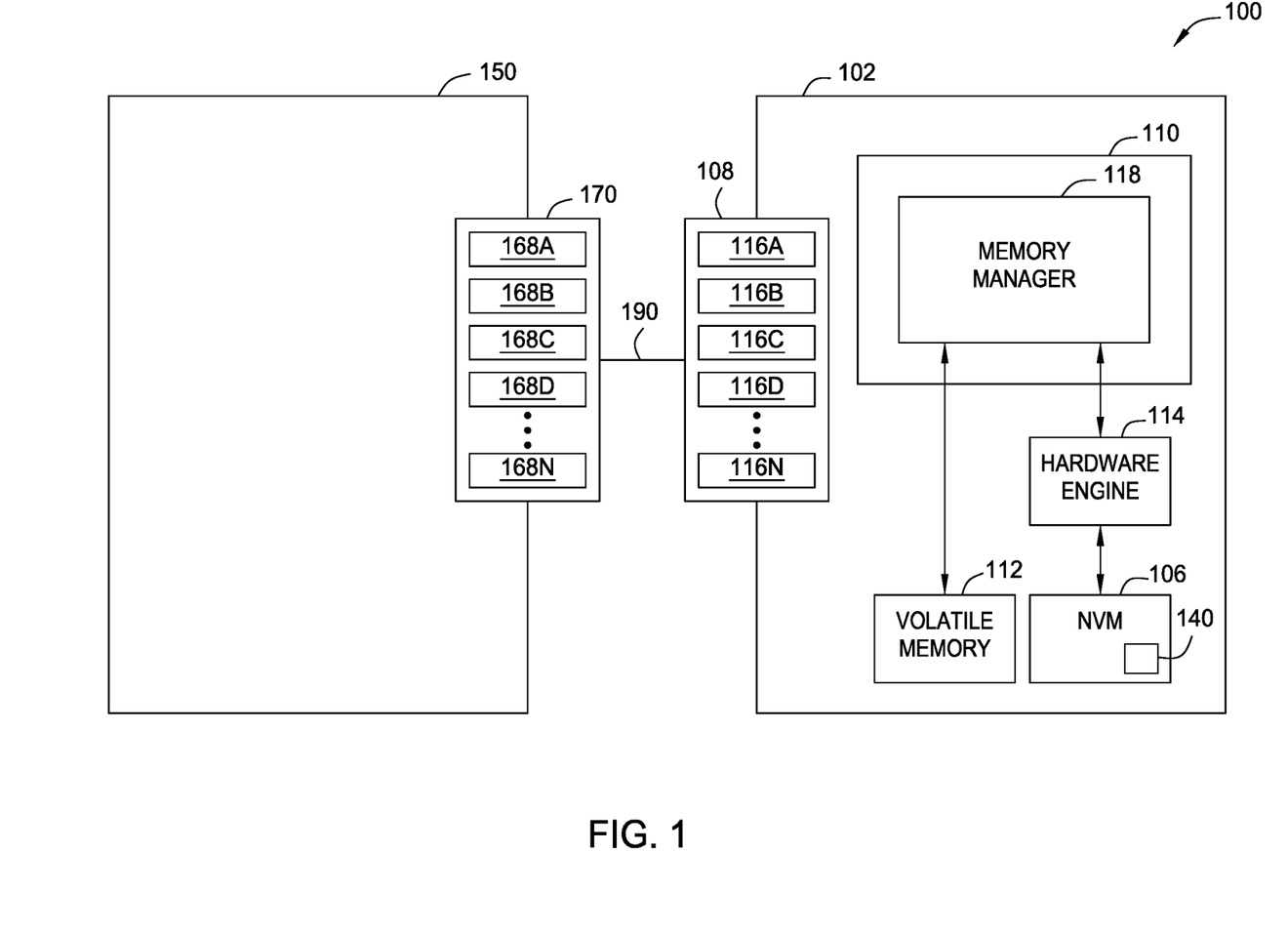
FIG. 1 is a schematic illustration of a system according to one embodiment.

FIG. 1 is a schematic illustration of a system 100 according to one embodiment. The system 100 includes one or more initiators or hosts 150 and one or more target devices 102, such as a data storage device, for the host 150 as shown. The host 150 may utilize non-volatile memory (NVM) 106 included in target device 102 to store and retrieve data.

Host 150 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, and video streaming devices. In certain embodiments, host 150 includes any device having a processing unit or any form of hardware capable of processing data, including a general purpose processing unit (such as a central processing unit (CPU)), dedicated hardware (such as an application specific integrated circuit (ASIC)), configurable hardware such as a field programmable gate array (FPGA), or any other form of processing unit configured by software instructions, microcode, or firmware.

NVM 106 of target device 102 may be configured for long-term storage of information as non-volatile memory space and retain information after power on/off cycles. Examples of non-volatile memory include flash memories, phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories. Magnetic media non-volatile memory may be one or more magnetic platters in target device 102. Each platter may contain one or more regions of one or more tracks of data.

Target device 102 may include a hardware engine 114 interfacing with the NVM 106. When target device 102 is a solid-state drive, hardware engine 114 may be logic engines controlling read and write operations to NVM 106. When target device 102 is a hard disk drive, hardware engine 114 may be magnetic read/write heads and accompanying hardware to configure, drive, and process the signals sensed by the magnetic read/write head.

Target device 102 may include a volatile memory 112 for short-term storage or temporary memory during operation of target device 102. Volatile memory 112 does not retain stored data if powered off. Examples of volatile memories include random access memories (RAM), dynamic random access memories (DRAM), static random access memories (SRAM), and other forms of volatile memories.

Target device 102 may include a controller 110, which may manage one or more operations of target device 102. Controller 110 may interface with host 150 via one or more target ports 108 and manage the storage of data to and the retrieval of data from NVM 106 via hardware engine 114. For example, controller 110 may manage writes to and reads from NVM 106 and volatile memory 112. Controller may include a memory manager 118 that manages the memory allocation between NVM 106 and volatile memory 112. Controller 110 may include any combination of software, hardware, and/or firmware.

For ease of illustration purposes, target device 102 includes additional components not shown in FIG. 1. For example, target device 102 may include power delivery components, such as a battery, a capacitor, or super capacitor. Target device 102 may include a printed circuit board (PCB) mechanically attaching components of target device 102 with electrically conductive traces that electrically interconnect components of target device 102.

Target device 102 may include any form factor and any enclosure. In some examples, the physical dimensions and connector configurations of target device 102 may conform to one or more standard form factors. Some example standard form factors include, but are not limited to, 3.5" solid-state drive (SSD) or hard disk drive (HDD), 2.5" SDD or HDD, or 1.8" SSD or HDD.

Target device 102 may execute non-transitory, computer-readable medium 140 that stores code or instructions for operating target device. The non-transitory, computer-readable medium 140 may be included in NVM 106 or firmware of the target device 102.

Target device 102 may include one or more physical connections 116A-116N, also known as phy (singular) or phys (plural). Host 150 may include one or more phys 168A-168N. Each phy may include transmitters and receivers for communication with phys of other devices. For example, target phys 116A-116N of target device 102 may be configured to communicate with the host phys 168A-168N of host 150 over one or more communication links 190 or over one or more expanders (not shown). In certain embodiments, target device 102 may include four phys 116A-116D. In still other examples, target device 102 may include more than four phys 116A-116N.

Target phys 116A-116N may be configured into one or more target ports 108, and host phys 168A-168N may be configured into one or more host ports 170. Target ports 108 and host ports 170 may include one or more buses for exchanging data and exchanging operations. Target port 108 via target phys 116A-116N may be configured to receive and transmit signals associated with an operation to be performed by the target phys 116A-116N. Examples of operations that may be performed by target phys 116A-116N include a write operation, a read operation, a data transfer, or a data deletion, among other things.

A single target phy 116 configured into a single port is a narrow port. Two or more target phys 116A-116N configured into a single port is a wide port. The target ports 108 of target device 102 may be configured to communicate with host 150 in a number of configurations. For example, for target device 102 having four phys 116A-116D, the target ports 108 may be configured into the following narrow-wide port configurations: (i) four narrow ports, each having one target phy; (ii) two narrow ports, each having one target phy, and one wide port having two target phys; (iii) one narrow port having one target phy and one wide port having three target phys; (iv) two wide ports, each having two target phys; and (v) one wide port having four target phys.

In general, the narrow-wide port configuration of the target ports 108 and the host ports 170 are independent of each other. The target ports 108 of target device 102 may be configured in various narrow-wide port configurations while the host ports 170 of host 150 may be configured in differing narrow-wide port configurations.

Target phys 116A-116N are electrically connected to controller 110 allowing data to be exchanged between host 150 and controller 110. Target phys 116A-116N are a part of the controller 110 and partitioned as a sub-block for internal logic of the controller 110, but, for ease of illustration, have been shown as elements connected to the controller. In some examples, the electrical connection of target port 108 through one or more target phys 116A-116N may permit target device 102 to receive power from host 150.

Target ports 108 of target device 102 may operate in accordance with any suitable protocol. In certain embodiments, target ports 108 operate following the serially attached SCSI (SAS) interface protocol. In other embodiments, the target ports 108 may operate in accordance with one or more of the interface protocols, such as serially attached SCSI (SAS), advanced technology attachment (ATA) (e.g., serial-ATA (SATA), parallel-ATA (PATA)), Fibre Channel Arbitrated Loop (FCAL), small computer system interface (SCSI), peripheral component interconnect (PCI), PCI-express (PCIe), and non-volatile memory express (NVMe) protocols.

Figure 2:
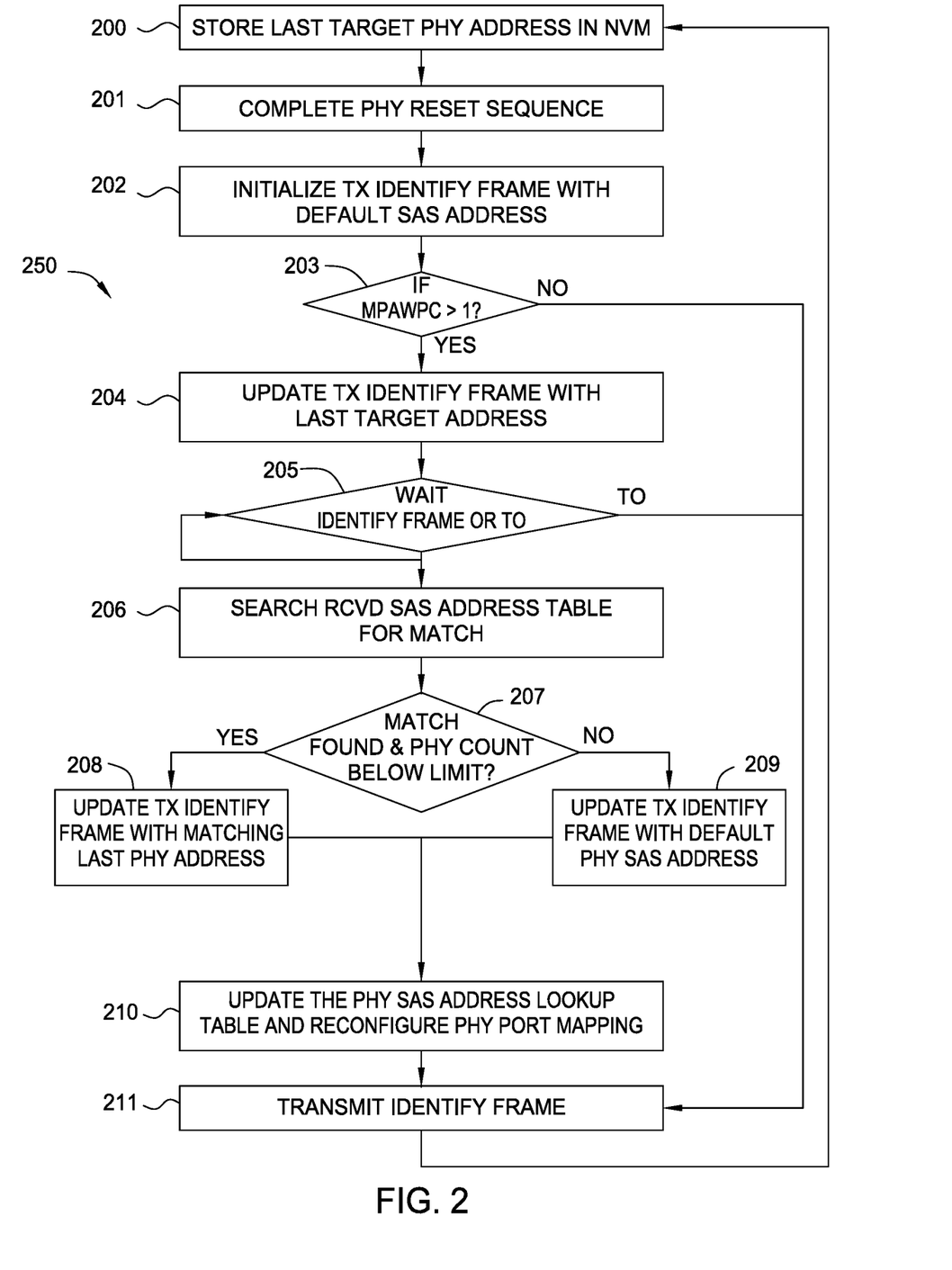
FIG. 2 is a flowchart showing management of various phys of a target according to one embodiment.

FIG. 2 is a flowchart 250 showing management of various target phys of a target device according to one embodiment. For illustration purposes, embodiments will be described on target device 102 comprising a memory storage device having four target phys 116A-116D coupled to host 150 through a communications link 190 as shown in FIG. 1. Embodiments of management of various phys may be used on other target devices and other memory storage devices besides the system as shown in FIG. 1. For example, embodiments of management of various target phys of a target device may be used on a target memory storage device having two target phys or having more than four target phys.

At block 200, a link is already established between target device 102 and host 150. Target phy SAS addresses of target phys 116A-116D used in the link with the host 150 are stored in NVM 106 by the firmware or hardware of target device 102. These stored target phy SAS addresses are called last target phy SAS addresses.

At block 201, target device 102 performs a target phy reset sequence, such as a target phy reset sequence under the SAS protocol. Target phy reset sequence may be performed on a power on, a hard reset, or management reset of target device 102, such as when target device 102 is moved between systems, when cabling changes occur to target device 102, when an expander (not shown) coupled to target device (102) undergoes a configuration change, or when other updates to the system occur. During a phy reset sequence, out of band (OOB) signals are exchanged between host 150 and target device 102 to establish a commonly supported speed and to establish the communication protocol. Each target phy 116 may complete the target phy reset sequence at different times and at different orders.

At block 202, for the target phy 116 that has completed the phy reset, target device 102 initializes a target identify frame to be transmitted to host 150 with the default target phy SAS address for that particular target phy. An identify frame includes a SAS address and a phy identifier to create a link between a target phy 116 and a host phy 168. Target device 102 may continue to perform a target phy reset of the other target phys 116 while target device 102 performs the identification sequence for the target phy 116 that has completed the target phy reset.

At block 203, target device 102 checks a configuration mode setting enabling automatic configuration of target phys 116A-116D into wide port configuration when there is a wide port opportunity. The configuration mode setting is the desired maximum number of target phys 116A-116D in a common target port 108. For illustration purposes, this mode setting may be named maximum phy auto wide port configuration (MPAWPC) mode setting. For example, when the MPAWPC setting is one, target device 102 may only assign one target phy 116 for a common target port 108. Therefore, each target phy operates in a narrow port configuration. When the MPAWPC setting is two, target device 102 may assign a maximum of two target phys (i.e., two or less) for a common target port 108. When the MPAWPC setting is three, target device 102 may assign a maximum of three target phys (i.e., three or less) for a common target port 108. When the MPAWPC setting is four, target device 102 may assign a maximum of four target phys (i.e., four or less) for a common target port 108. If target device 102 has more than four target phys 116A-116N, the MPAWPC setting may be more than four as well as one, two, three, or four. The MPAWPC setting may be selected from a host mode page control command provided by the host 150 to target device 102.

When the MPAWPC setting is one, auto configuration of the target phys 116A-116D into wide ports is disabled. At block 211, target device 102 transmits the target identify frame with the default target SAS identify address provided at block 202. After the target device 102 receives the host identify SAS address, the identification sequence completes on the target phy 116 and a link is established with host 150 in which the target phy is in a default port configuration.

When the MPAWC setting is greater than one, target device 102 automatically determines opportunities to group target phys 116A-116D into common target port(s) 108 for wide port configuration. Therefore, when MPAWPC setting is two or more, auto-configuration of the target phys 116A-116D of target device 102 into wide ports is enabled.

At block 204, target device 102 updates the target identify frame to be transmitted with the last target phy SAS address from block 200.

At block 205, target device 102 waits or withholds the target identify frame for this particular target phy until the host identify frame is received or until a certain amount of the time out window (such as 80% of the time out window). Target device 102 waits or withholds the target identify frame to receive the host identify frame so that the target device 102 may adjust target phys 116A-116D into a wide port configuration if there is a wide port opportunity.

At block 205, when target device 102 does not receive the host identify frame prior to a timeout window of an identification sequence under the SAS protocol, target device 102 transmits at block 211 the target identify frame with the last target phy SAS address provided at block 204. This particular target phy completes the link reset after receiving a host identify SAS address and is configured in a narrow port configuration or in a wide port configuration depending on whether a link reset has been completed on other target phy with the same target phy SAS address. The target phy may be configured into a narrow port if the last target address configured the target phy into a narrow port. The target phy may be configured into a wide port if the last target address configured the target phy into a wide port and the host address did not change from that last configuration (e.g. host transmits same SAS address as before that completed the wide port configuration). This particular target phy may be later re-configured from a narrow port into a wide port or from a wide port to another wide port having additional target phy(s) by updating the target identify frame of other target phys processed under the management flow described in flow chart 250.

At block 205, when target device 102 receives the host identify frame prior to a timeout window of the identification sequence, target device 102 proceeds to block 206. At block 206, target device 102 searches a phy SAS address lookup table for a matching received host identify SAS address presented on other target phys. If there are more than one matching received host identify SAS address, target device 102 may conduct an additional search using additional criteria to determine optimal mapping. For example, target device 102 may search for matches on the last target phy SAS address.

At block 207, (i) when target device 102 does not find a matching host identify SAS addresses for the particular target phy 116 with another target phy or (ii) when grouping the particular target phy 116 into a wide port will exceed the MPAWPC setting, target device 102 proceeds to block 209 in which the target identify frame is updated with the default target SAS address for that particular target phy. At block 210, target device 102 updates the phy SAS address lookup table with the received host identify SAS addresses and the last target SAS address for that particular target phy 116. Transmission of this identify frame at block 211 configures this particular target phy 116 into a default port configuration. This particular target phy 116 may be later re-configured by updating the target identify frame of other target phys processed under the management flow described in flow chart 250.

At block 207, when target device 102 finds a matching host identify SAS addresses for the particular target phy with another target phy(s) (i.e., matching target phy(s)) and when grouping the particular target phy with the matching target phy(s) into a wide port will not exceeded the MPAWPC setting, target device 102 proceeds to block 208. At block 208, target device 102 updates the target identify frame for that particular target phy with the last target phy SAS address for the matching phy(s). At block 210, target device 102 updates the phy SAS address lookup table with the received host identify SAS addresses and the last target phy SAS address for the matching phy(s). That particular target phy is configured into a wide port with the matching target phy(s). Therefore, the matching target phy is re-configured from a narrow port to a wide port with the particular target phy or the matching target phy(s) is re-configured to expand a prior wide port to include that particular target phy.

At block 211, target device 102 transmits the target identify frame for that particular target phy to establish a link between target device 102 and host 150. Each of the target phys 116A-116D may proceed through the target management flow as shown in flow chart 250 until each of the target phys 116-116D transmits its target phy SAS identify address in block 211 to complete the link sequence.

The management flow may proceed back to block 200 to store target phy SAS addresses of target phys 116A-116D as last target phy SAS addresses in NVM 106 of the target device 102. These last target phy SAS address may be used for configuration or re-configuration of the target phys 116A-116D as other target phys 116A-116D complete the link sequence or on other target phy resets.

The description of FIG. 2 illustrates one management flow. Other process flows are possible. For example, certain blocks in flowchart 250 may be optional or may be redundant. In other examples, certain blocks in flowchart 250 may be ordered in different sequences. In other examples, certain blocks in flowchart 250 may be separated into two or more blocks. In other examples, certain blocks in flowchart 250 may be combined.

EXAMPLES

The following are examples to illustrate various embodiments of the invention performing various embodiments of the target phy management flow as described in flowchart 250 in FIG. 2 as well as alternative embodiments. For illustration purposes, these examples will be described on a target device comprising a memory storage device having four target phys, such as target device 102 described in FIG. 1. Such examples are not meant to limit the scope of the invention unless specifically set forth in the claims.

Example 1

In Example 1, a mode setting MPAWPC value is set at four so that a target wide port may contain a maximum of four target phys.

Figure 3A:
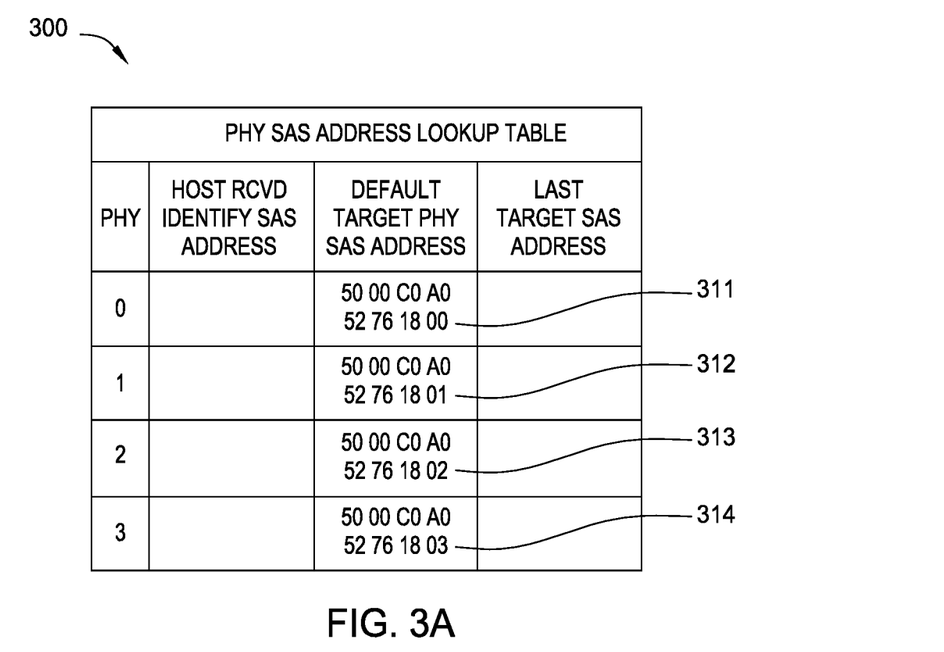
FIGS. 3A-3E are tables illustrating the target phy management according to Example 1.

Table 300 in FIG. 3A shows the initial state of the target phy SAS address lookup table prior to any target phys completing link reset sequence. Phy port mapping and SAS addresses are configured based on port configuration mode setting and the default target phy SAS addresses. In this example, the port configuration mode provides four separate unique default target SAS address 311, 312, 313, 314 for each target phy to use in a default narrow port configuration.

Figure 3B:
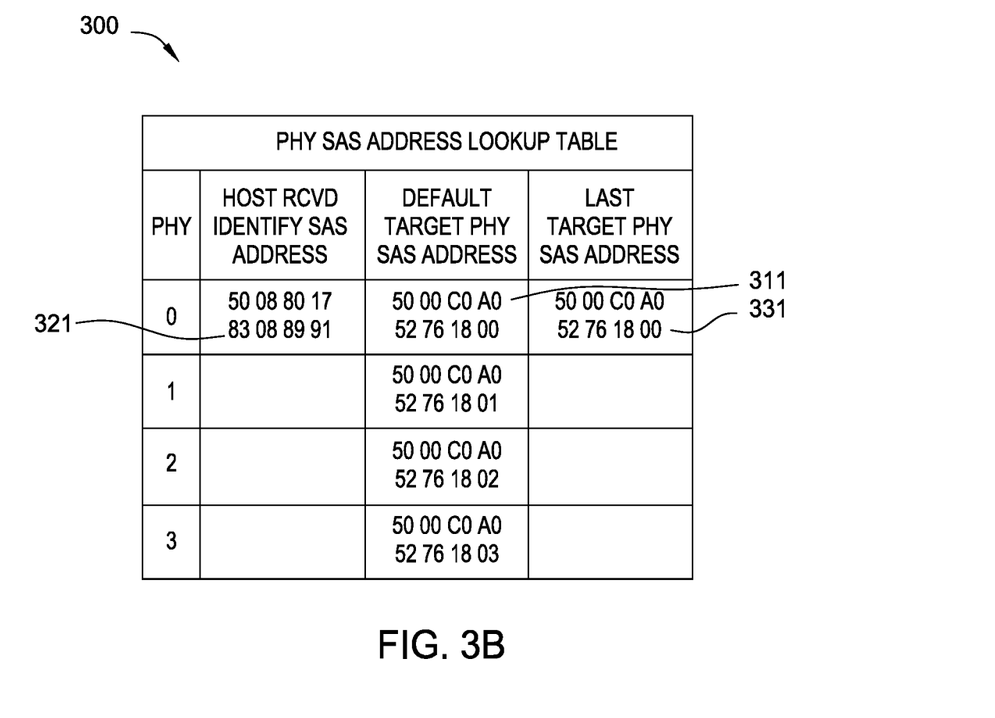

As shown in phy SAS address lookup table 300 in FIG. 3B, the target device completes link reset sequence on target phy 0. Target device checks whether wide port auto-configuration is enabled. In this example, since the MPAWPC is four, wide port auto-configuration is enabled. Target device waits to receive a host phy SAS address 321 on target phy 0 prior to transmitting an identify frame. The host received phy SAS address 321 is recorded in the lookup table. Target device searches for a matching or common host SAS address. Since no other host SAS address have been received yet, no matching or common host SAS address is found. Target device transmits an identify frame using default target phy SAS address 311 to establish a default port (which is a default narrow port in this example) on target phy 0. The SAS link reset sequence completes on target phy 0. The last target phy SAS address 331 for target phy 0 is updated with the value used in the transmitted identify SAS address and is stored in non-volatile memory.

Figure 3C:
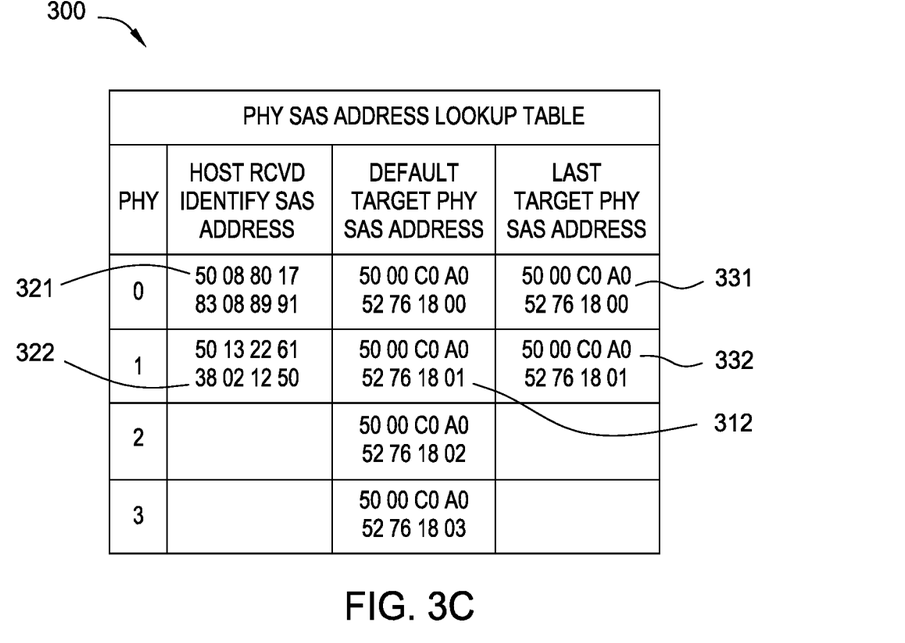

As shown in phy SAS address lookup table in FIG. 3C, the target device completes link reset sequence on target phy 1. Target device checks whether wide port auto-configuration is enabled. In this example, since the MPAWPC is four, wide port auto-configuration is enabled. Target device waits to receive a host phy SAS address 322 on target phy 1 prior to transmitting an identify frame. The host received phy SAS address 322 is recorded in the lookup table. Target device searches for a matching or common host SAS address. Since host received phy SAS address 322 on target phy 1 does not match the host received SAS address 321 on target phy 0 and is an unique address, there is no opportunity for a target wide port. Target device transmits an identify frame using the default target phy SAS address 312 to establish a narrow port on target phy 1. The SAS link reset sequence completes on phy 1. The last target phy SAS address 332 for target phy 1 is updated with the value used in the transmitted identify SAS address and is stored in non-volatile memory.

Figure 3D:
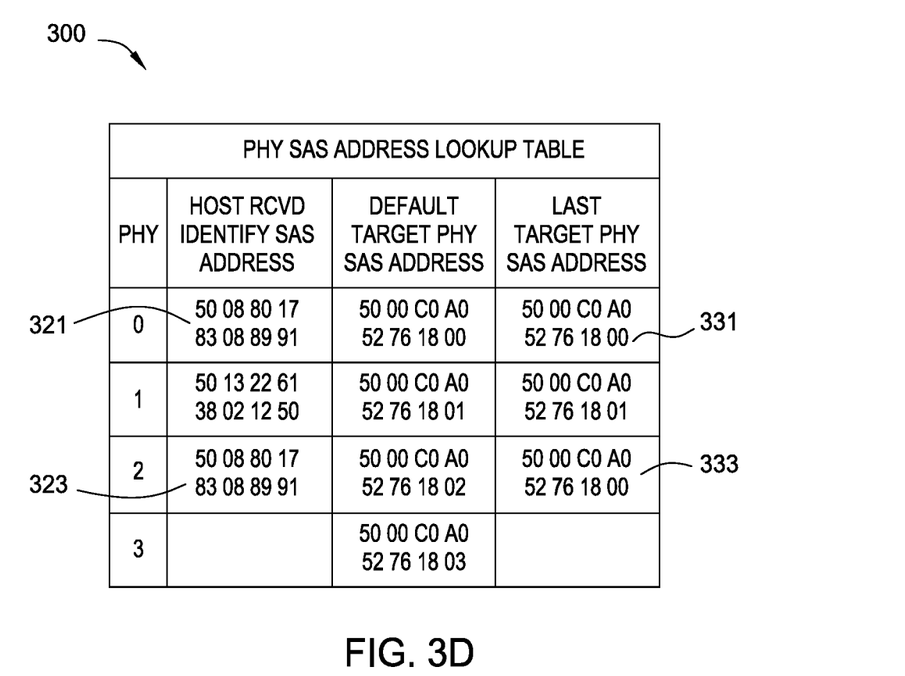

As shown in phy SAS address lookup table in FIG. 3D, the target device completes link reset sequence on target phy 2. Target device checks whether wide port auto-configuration is enabled. In this example, since the MPAWPC is four, wide port auto-configuration is enabled. Target device waits to receive a host phy SAS address 323 on target phy 2 prior to transmitting an identify frame. The host received phy SAS address 323 is recorded in the lookup table. Target device searches for a matching or common host SAS address. During host SAS address lookup, a matching common SAS address 321, 323 is found on target phy 0 and target phy 2. Since configuring target phy 0 and target phy 2 into a wide port will not exceed the MPAWPC setting, target device establishes a wide port with target phy 0 and target phy 2 by updating the identify SAS address for target phy 2 with the last target phy SAS address 331 used for target phy 0. Target device transmits the updated identify frame, and the SAS link reset sequence completes on phy 2. Wide port is established between target phy 0 and target phy 2 dynamically. The last target phy SAS address 333 for target phy 2 is updated with the value used in the transmitted identify SAS address and is stored in non-volatile memory.

Figure 3E:
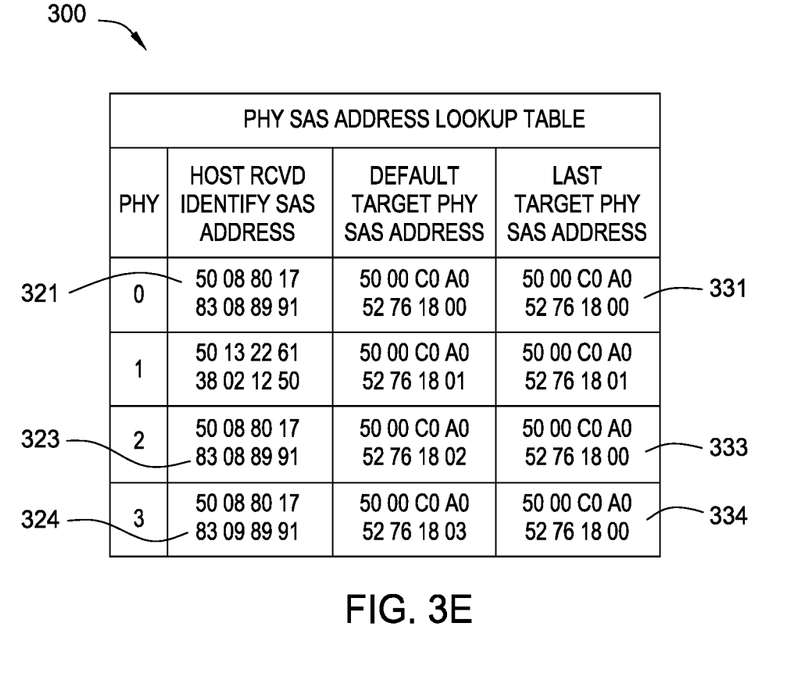

As shown in phy SAS address lookup table 300 in FIG. 3E, the target device completes link reset sequence on target phy 3. Target device checks whether wide port auto-configuration is enabled. In this example, since the MPAWPC is four, wide port auto-configuration is enabled. Target device waits to receive a host phy SAS address 324 on target phy 3 prior to transmitting an identify frame. The host received phy SAS address 324 is recorded in the lookup table. Target device searches for a matching or common host SAS address. During host SAS address lookup, a matching common SAS address 321, 323, 324 is found on target phy 0, target phy 2, and target phy 3. Since configuring target phy 0, target phy 2, and phy 3 into a wide port will not exceed the MPAWPC setting, target device establishes a wide port with target phy 0, target phy 2, and target phy 3 by updating the identify SAS address for target phy 3 with the last target phy SAS address 331, 333 used for target phy 0 and for target phy 2. Target device transmits the updated identify frame, and the SAS link reset sequence completes on phy 3. Wide port is established between target phy 0, target phy 2, and target phy 3 dynamically. The last target phy SAS address 334 for target phy 3 is updated with the value used in the transmitted identify SAS address and is stored in non-volatile memory.

Example 2

In Example 2, a mode setting MPAWPC value is set at two so that a target wide port may contain a maximum of two target phys.

Figure 4A:
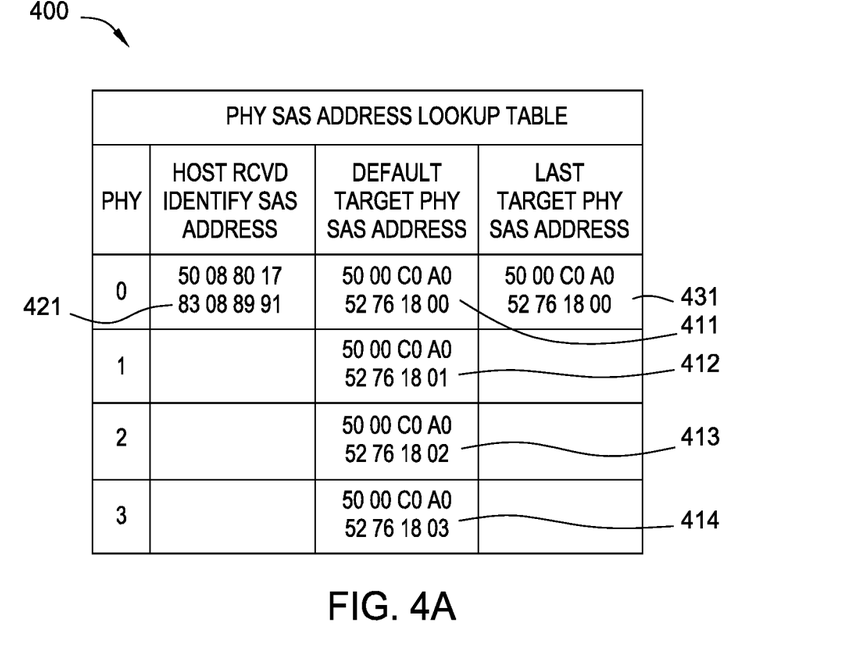
FIGS. 4A-4D are tables illustrating the target phy management according to Example 2.

As shown in phy SAS address lookup table 400 in FIG. 4A, a target device completes link reset sequence on target phy 0. Phy port mapping and SAS addresses are configured based on port configuration mode setting and the default target phy SAS addresses. In this example, the port configuration mode provides four separate unique target SAS address 411, 412, 413, 414 for each target phy to use in a default narrow port configuration. The target device completes link reset sequence on target phy 0. Target device checks whether wide port auto-configuration is enabled. In this example, since the MPAWPC is two, wide port auto-configuration is enabled. Target device waits to receive a host phy SAS address 421 on target phy 0 prior to transmitting an identify frame. The host received phy SAS address 421 is recorded in the lookup table. Target device searches for a matching or common host SAS address. Since no other host SAS addresses have been received yet, no matching or common host SAS address is found. Target device transmits an identify frame using default target phy SAS address 411 to establish a default port (which is a default narrow port in this example) on target phy 0. The SAS link reset sequence completes on target phy 0. The last target phy SAS address 431 for target phy 0 is updated with the value used in the transmitted identify SAS address and is stored in non-volatile memory.

Figure 4B:
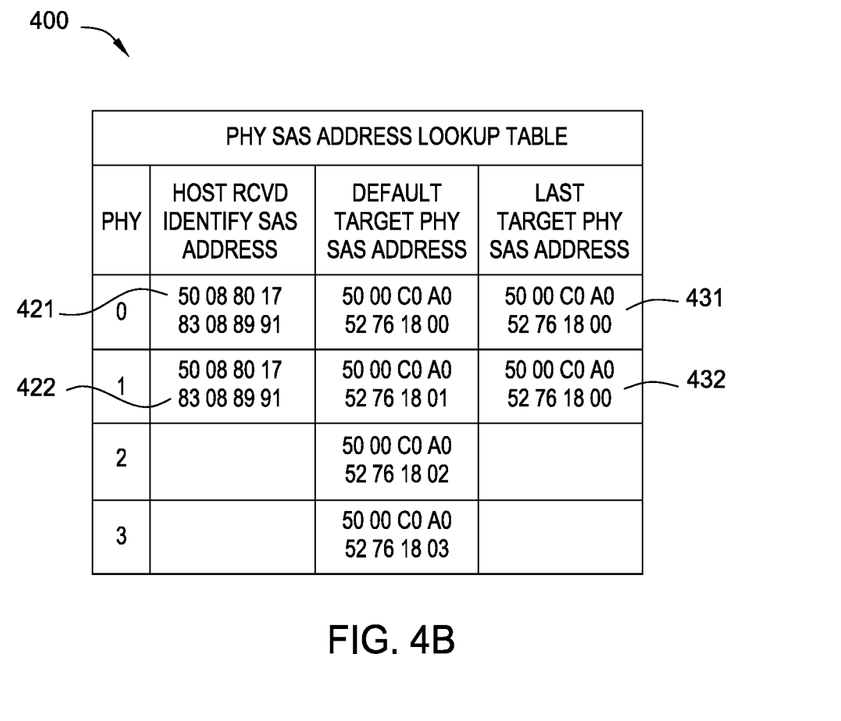

As shown in phy SAS address lookup table 400 in FIG. 4B, the target device completes link reset sequence on target phy 1. Target device checks whether wide port auto-configuration is enabled. In this example, since the MPAWPC is two, wide port auto-configuration is enabled. Target device waits to receive a host phy SAS address 422 on target phy 1. The host received phy SAS address 422 is recorded in the lookup table. Target device searches for a matching or common host SAS address. Since host received phy SAS address 422 on target phy 1 matches the host received SAS address 421 on target phy 0, there is an opportunity for a target wide port. Since configuring target phy 0 and target phy 1 into a wide port will not exceed the MPAWPC setting of two, target device establishes a wide port with target phy 0 and target phy 1 by updating the identify SAS address for target phy 1 with the last target phy SAS address 431 used for target phy 0. Target device transmits the updated identify frame, and the SAS link reset sequence completes on phy 1. Wide port is established between target phy 0 and target phy 1 dynamically. The last target phy SAS address 432 for target phy 1 is updated with the value used in the transmitted identify SAS address and is stored in non-volatile memory.

Figure 4C:
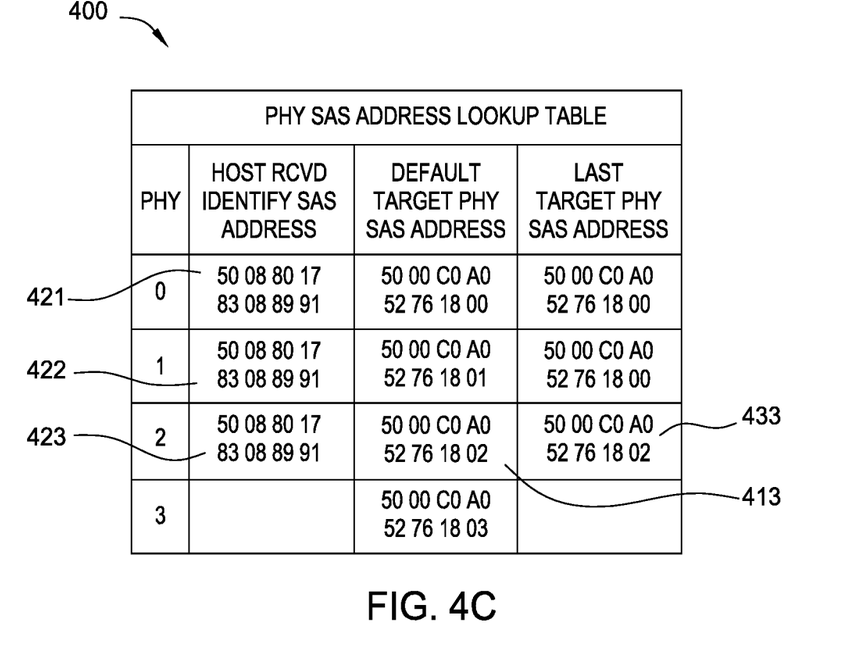

As shown in phy SAS address lookup table 400 in FIG. 4C, the target device completes link reset sequence on target phy 2. Target device checks whether wide port auto-configuration is enabled. In this example, since the MPAWPC is two, wide port auto-configuration is enabled. Target device waits to receive a host phy SAS address 423 on target phy 2. The host received phy SAS address 423 is recorded in the lookup table. Target device searches for a matching or common host SAS address. Since host received phy SAS address 423 on target phy 2 matches the host received SAS address 421, 422 on target phy 0 and for target phy 1, there is an opportunity for an expanded target wide port. However, since configuring target phy 0, target phy 1, and target phy 2 into a wide port will exceed the MPAWPC setting of two, target device transmits an identify frame using default target SAS 413 to establish a narrow port on target phy 2. The SAS link reset sequence completes on phy 2. The last target phy SAS address 433 for target phy 2 is updated with the value used in the transmitted identify SAS address and is stored in non-volatile memory.

Figure 4D:
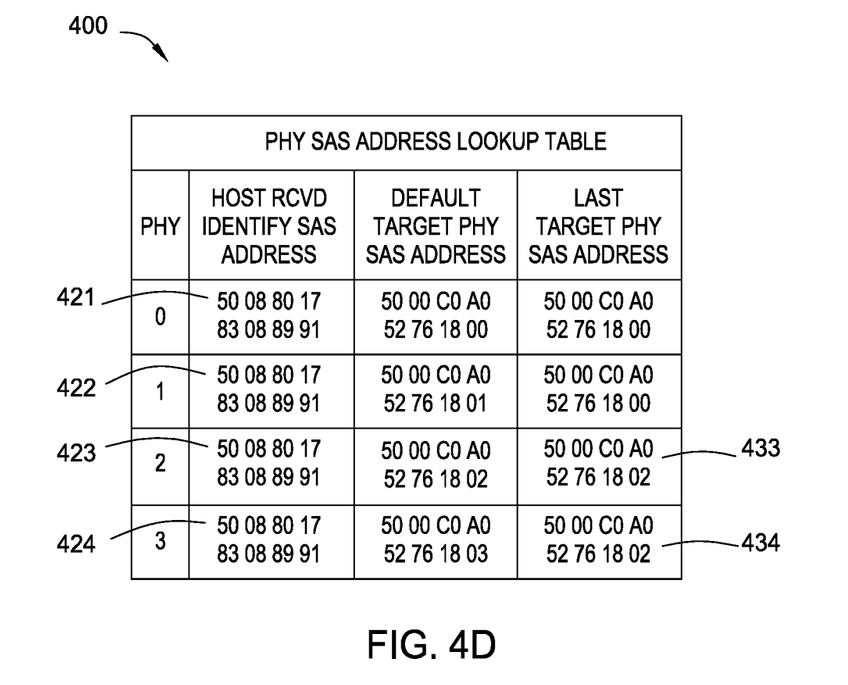

As shown in phy SAS address lookup table 400 in FIG. 4D, the target device completes link reset sequence on target phy 3. Target device checks whether wide port auto-configuration is enabled. In this example, since the MPAWPC is two, wide port auto-configuration is enabled. Target device waits to receive phy SAS address 424 on target phy 3. The host received phy SAS address 424 is recorded in the lookup table. Target device searches for a matching or common host SAS address. During host SAS address lookup, a matching common SAS address 421, 422, 423, 424 is found on target phy 0, target phy 1, target phy 2, and target phy 3. Since configuring target phy 0, target phy 1, and target phy 3 into a wide port will exceed the MPAWPC setting of two, target device determines if there are other wide port opportunities with other target phys. Since configuring target phy 2 and target phy 3 into a wide port will not exceed the MPAWPC setting of two, target device establishes a wide port with target phy 2 and target phy 3 by updating the identify SAS address for target phy 3 with the last target phy SAS address 433 used for target phy 2. Target device transmits an identify frame, and the SAS link reset sequence completes on target phy 3. Wide port is established between target phy 2 and target phy 3 dynamically. The last target phy SAS address 434 for target phy 3 is updated with the value used in the transmitted identify SAS address and is stored in non-volatile memory.

Target device has now auto-configured four target phys into two wide ports each with two target phys (i.e., 2×2 configuration).

Example 3

In Example 3, a mode setting MPAWPC value is set at two so that a target wide port may contain a maximum of two target phys. The target device has previously configured phy 0 and phy 1 in a wide port.

Figure 5A:
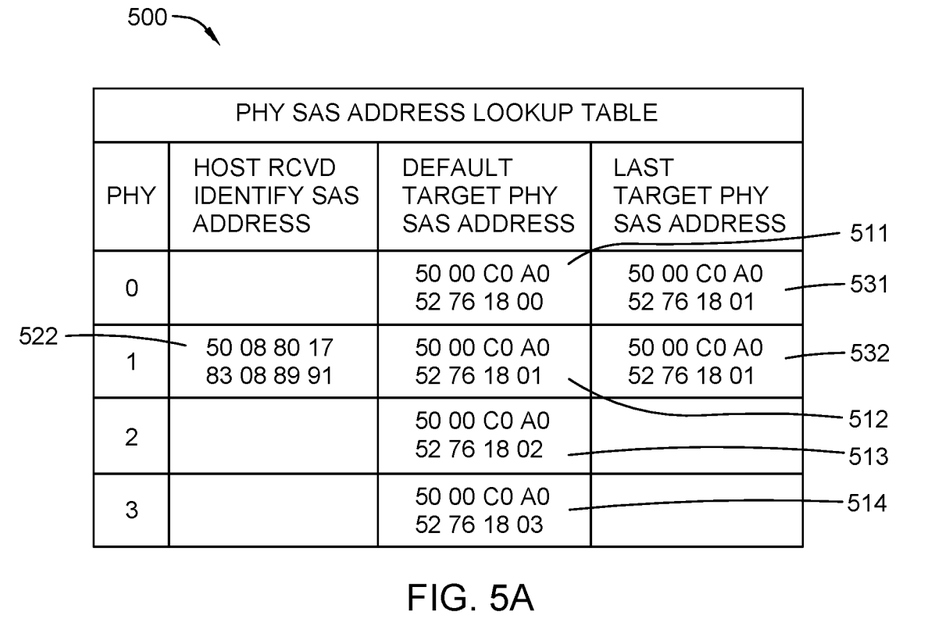
FIGS. 5A-5D are tables illustrating the target phy management according to Example 3.

The initial state of phy SAS address lookup table 500 in FIG. 5A has the last target phy SAS addresses 531, 532 initialized for phy 0 and for phy 1. Then, FIG. 5A illustrates that a target device completes a link reset sequence on phy 1. Phy port mapping and SAS addresses are configured based on the port configuration mode setting and the default target phy SAS addresses. In this example, the port configuration mode provides four separate unique target SAS address 511, 512, 513, 514 for each target phy in a default narrow port configuration. Target device completes link reset sequence on target phy 1. Target device checks whether wide port auto-configuration is enabled. In this example, since the MPAWPC is two, wide port auto-configuration is enabled. Target device waits to receive a host phy SAS address 522 on target phy 1. The host received phy SAS address 522 is recorded in the lookup table. Target device searches for a matching or common host SAS address. Since no other host SAS addresses have been received yet, no matching or common host SAS address is found. Target device transmits an identify frame using default target phy SAS address 512 to establish a default port (which is a default narrow port in this example) on target phy 1. The SAS link reset sequence completes on target phy 1. The last target phy SAS address 532 for target phy 1 is updated with the value used in the transmitted identify SAS address and is stored in non-volatile memory.

Figure 5B:
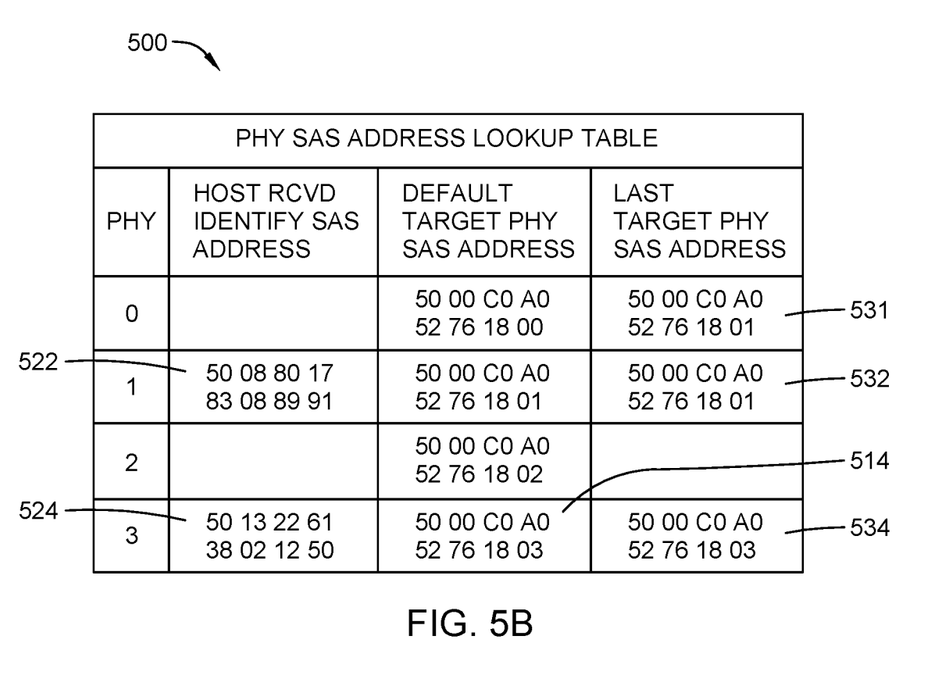

As shown in phy SAS address lookup table 500 in FIG. 5B, the target device completes link reset sequence on target phy 3. Target device checks whether wide port auto-configuration is enabled. In this example, since the MPAWPC is two, wide port auto-configuration is enabled. Target device waits to receive a host phy SAS address 524 on target phy 3. The host received phy SAS address 524 is recorded in the lookup table. Target device searches for a matching or common host SAS address. Since host received phy SAS address 524 on target phy 3 does not match the host received SAS address 522 on target phy 1 and is a unique address, there is no opportunity for a target wide port. Target device transmits an identify frame using default target SAS address 514 to establish a narrow port on target phy 3. The SAS link reset sequence completes on phy 3. The last target phy SAS address 534 for target phy 3 is updated with the value used in the transmitted identify SAS address and is stored in non-volatile memory.

Figure 5C:
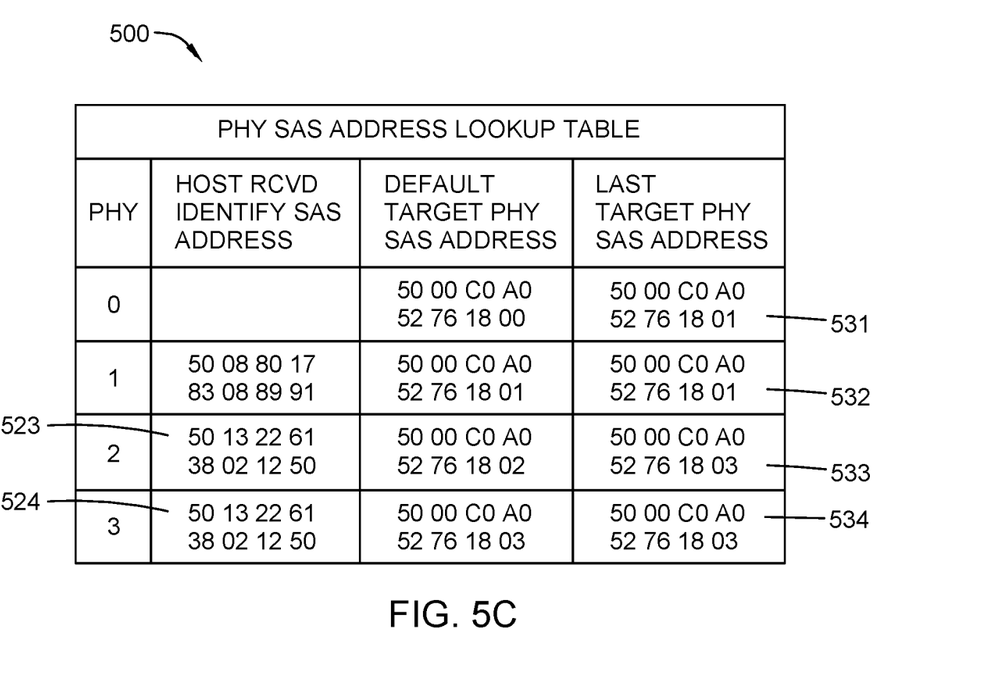

As shown in phy SAS address lookup table 500 in FIG. 5C, target device completes link reset sequence on target phy 2. Target device checks whether wide port auto-configuration is enabled. In this example, since the MPAWPC is two, wide port auto-configuration is enabled. Target device waits to receive a host phy SAS address 523 on target phy 2. The host received phy SAS address 523 is recorded in the lookup table. Target device searches for a matching or common host SAS address. Since host received phy SAS address 523 on target phy 2 matches the host received SAS address 524 on target phy 3, there is an opportunity for a target wide port. Since configuring target phy 2 and target phy 3 into a wide port will not exceed the MPAWPC setting of two, target device establishes a wide port with target phy 2 and target phy 3 by updating the identify SAS address for target phy 2 with the last target phy SAS address 534 used for target phy 3. Target device transmits an identify frame, and the SAS link reset sequence completes on target phy 2. Wide port is established between target phy 2 and target phy 3 dynamically. The last target phy SAS address 533 for target phy 2 is updated with the value used in the transmitted identify SAS address and is stored in non-volatile memory.

Figure 5D:
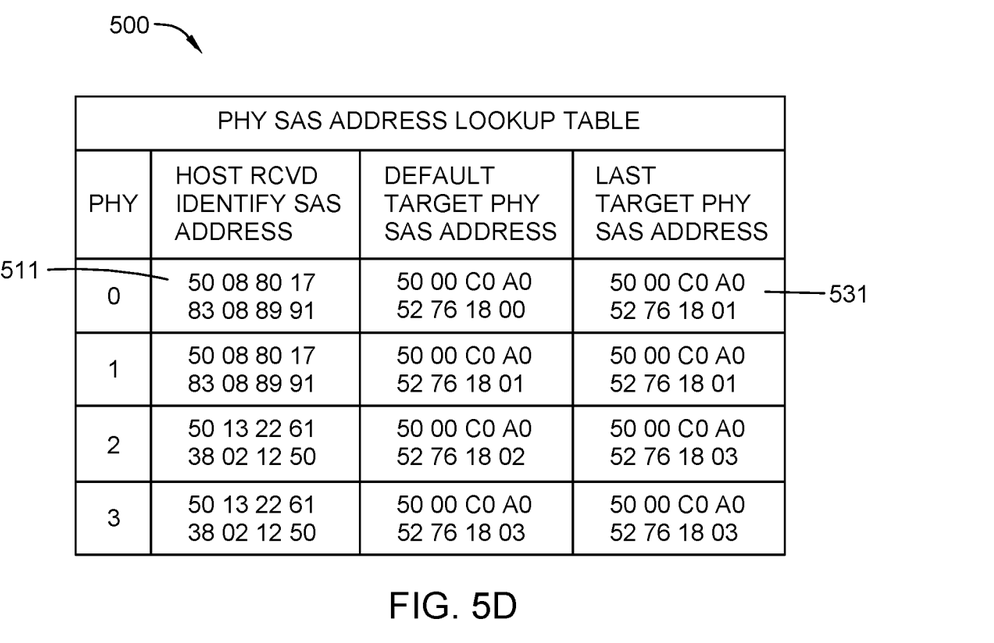

As shown in phy SAS address lookup table 500 in FIG. 5D, target device completes link reset sequence on target phy 0. Target device checks whether wide port auto-configuration is enabled. Since the MPAWPC is two, wide port auto-configuration is enabled. Target device waits for a host identify frame to be received for a certain amount of the time out window (such as 80% of the time out window) but has not yet received the host identify frame on target phy 0. Since the host SAS address for the target phy 0 has not yet been received, the target device transmits an identify SAS address for target phy 0 with the last target phy SAS address 531 (in this case the same SAS address of target phy 1) used for target phy 0 prior to the target phy reset. Target device receives host phy SAS address 511. The SAS link reset sequence completes on target phy 0. Since the host phy SAS address received on phy 0 matches the host phy SAS address received on phy 1, a wide port is established between target phy 0 and target phy 1 dynamically. The last target phy SAS address 531 for target phy 0 is updated with the value used in the transmitted identify SAS address and is stored in non-volatile memory. In this example, the target device transmitted the last target phy SAS address for target phy 0 prior to receiving a host identify SAS address and provided an opportunity to establish a wide port on target phy 0 in the event that the host identify SAS address would be common with phy 1 when it was received.

Target device has now auto-configured four target phys into two wide ports each with two target phys (i.e., 2×2 configuration).

In certain embodiments, management of various target phys into a wide port configuration occurs dynamically by the target device or data storage device as described in flowchart 250 of FIG. 2 and in Examples 1-3. For example, instead of immediately transmitting a target identify frame, the target device waits to receive host identify frames, such as at block 205 of flowchart 250, and configures the target phys in a wide port for matching received host identify SAS addresses, such as at block 210 of flowchart 250. The target device strategically uses the identify timeout window during SAS identification sequence to wait to receive the host SAS identify addresses. Then, the target device makes adjustments to the target port configurations.

In certain embodiments, management of various target phy updates re-configures prior port configurations as described in flowchart 250 of FIG. 2 and in Examples 1-3. For example, a target phy is re-configured from a narrow port to a wide port as another target phy is presented with a common host identify SAS address, or target phys are re-configured to expand a prior wide port to include another target phy as this target phy is presented with a common host identify SAS address.

In certain embodiments, management of various target phys into narrow port or wide port configurations occurs by transmitting consistent SAS target addresses across power resets or link resets as described in flowchart 250 of FIG. 2 and in Examples 1-3. The last target phy SAS address is stored persistently in non-volatile memory so that SAS addresses are not recreated in resets. As the target phys are powered up and the links are reset, default target phy SAS addresses can be readied to be transmitted, but replaced with last target phy SAS address values stored in non-volatile memory if there is a wide port opportunity. In certain embodiments, the target device may automatically reconfigure the target into a wide port configuration across resets using the same SAS target addresses independent of the order that the target phys complete SAS link reset sequence.

In certain embodiments, a mode setting provides the flexibility to specify the maximum number of target phys in a wide port as described in flowchart 250 of FIG. 2 and in Examples 1-3. For example, for a target device having four target phys in certain instances, a configuration of two wide ports each with two target phys (i.e., 2×2 configuration) may be desirable. Thus, a mode setting of two enables the target device to auto-configure the target phys in a 2×2 configuration when there is an opportunity. In another example, for a target device having four target phys in certain instances, a configuration of one wide port having four target phys (i.e., 1×4 configuration) may be desirable. Thus, a mode setting of four enables the target device to auto-configure the target phys in a 1×4 configuration when there is an opportunity.

In certain embodiments, management of various target phys may proceed with a default setting as described in the flowchart 250 of FIG. 2 and in Examples 1-3. For example, if the mode setting of the desired maximum target phys in a port is reached, then the target device may use a default target phy SAS address, such as at block 209, to configure the target phy into a default target port.

In certain embodiments, a target device may dynamically update target SAS addresses to align with wide port opportunities presented by a host without manual intervention as described in the flowchart 250 of FIG. 2 and in Examples 1-3.

In certain embodiments, a target device automatically adapts to system configuration changes as described in the flowchart 250 of FIG. 2 and in Examples 1-3. System configuration changes may occur when target is moved between systems, when cabling changes occur to the target device, when an expander coupled to the target device undergoes a configuration change, or when other updates to the system occur. For example, in certain embodiments, it is desirable to have target devices with a common part number installed in multiple systems. Since the common part number target devices can only have one default setting, target devices may dynamically adjust wide ports through a mode setting without downloading new code and without any changes to the host.

In certain embodiments, management of various target phys as described in the flowchart 250 of FIG. 2 and in Examples 1-3 is compliant with SAS standards.

In certain embodiments, management of various target phys as described in flowchart 250 of FIG. 2 and in Examples 1-3 is compliant with existing infrastructure (e.g. expanders, enclosures, buses, cabling, etc.) without any additional firmware or hardware changes. In certain embodiments, management of various target phys as described in the flowchart 250 of FIG. 2 and in Examples 1-3 can be implemented without adding any additional firmware or hardware.

In certain embodiments, wide port configurations are remembered across resets by storing the addresses used in identify frames in non-volatile memory as described in flow chart 250 of FIG. 2 and in Examples 1-3.

Certain embodiments of the disclosure provide one or more of the following aspects. A method and data storage device which automatically configures the phys of the storage device in a wide port configuration by automatically aligning with host wide port opportunities. A method and data storage device which allows the storage device to adapt to moving the data storage device between different connections with a host. A method and data storage device which is complaint with SAS standards. A method and data storage device which is compatible with existing infrastructure (i.e., expanders, enclosures, and HBAs). A method and data storage device which remembers wide port configurations across boot/power resets. A method and data storage device with the ability to auto-configure the maximum number phys per wide port.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a controller;
a first phy;
a second phy;
a third phy;
a fourth phy; and
a non-transitory computer readable storage medium containing instructions when executed by the controller cause the controller to:
wait to receive a host phy SAS address on the first phy;
record the host phy SAS address in a lookup table;
transmit an identify frame using a target phy SAS address to a host device after receiving the host phy SAS address on the first phy to configure a narrow port with the first phy;
wait to receive a host phy SAS address on the second phy;
record the host phy SAS address in the lookup table;
search for a matching SAS address;
transmit a first updated identify frame using the target phy SAS address to the host device after receiving the host phy SAS address on the second phy to re-configure a wide port with the first phy and the second phy;
wait to receive a host phy SAS address on the third phy;
record the host phy SAS address in the lookup table;
search for a matching SAS address; and
transmit a second updated identify frame using the target phy SAS address to the host device after receiving the host phy SAS address on the third phy to re-configure the wide port with the first phy, the second phy, and the third phy.

2. The data storage device of claim 1, wherein the non-transitory computer readable storage medium contains instructions when executed by the controller cause the controller to:
wait to receive a host phy SAS address on the fourth phy;
record the host phy SAS address in the lookup table;
search for a matching SAS address; and
transmit a third updated identify frame using the target phy SAS address to the host device after receiving the host phy SAS address on the fourth phy to re-configure the wide port with the first phy, the second phy, the third phy, and the fourth phy.

3. A data storage device, comprising:
a controller;
a first phy;
a second phy;
a third phy;
a fourth phy; and
a non-transitory computer readable storage medium containing instructions when executed by the controller cause the controller to:
receive a host phy SAS address on the first phy;
record the host phy SAS address in a lookup table;
transmit an identify frame using a default target phy SAS address to a host device;
receive a host phy SAS address on the second phy;
record the host phy SAS address in the lookup table;
search for a matching SAS address;
transmit an identify frame using the default target phy SAS address;
receive a host phy SAS address on the third phy;
record the host phy SAS address in the lookup table;
search for a matching SAS address;
establish a wide port with the first phy and the third phy; and
transmit an updated identify frame to the host device;
receive a host phy SAS address on the fourth phy;
record the host phy SAS address in the lookup table;
search for a matching SAS address;
determine whether grouping the first phy, the third phy, and the fourth phy would exceed a maximum phy auto wide port configuration mode setting;
establish a wide port with the first phy, the third phy, and the fourth phy; and
transmit an updated identify frame to the host device.

4. The data storage device of claim 3, wherein the non-transitory computer readable storage medium contains instructions when executed by the controller cause the controller to:
determine that the host phy SAS address received on the third phy matches the host phy SAS address received on the first phy.

5. The data storage device of claim 4, wherein the non-transitory computer readable storage medium contains instructions when executed by the controller cause the controller to:
determine that the host phy SAS address received on the fourth phy matches the host phy SAS address received on the first phy and the host phy SAS address received on the third phy.

6. A data storage device, comprising:
a controller;
a first phy;
a second phy;
a third phy;
a fourth phy; and
a non-transitory computer readable storage medium containing instructions when executed by the controller cause the controller to:
receive a host phy SAS address on the first phy;
record the host phy SAS address in a lookup table;
transmit an identify frame using a default target phy SAS address to a host device;
receive a host phy SAS address on the second phy;
record the host phy SAS address in the lookup table;
search for a matching SAS address;
transmit an identify frame using the default target phy SAS address;
receive a host phy SAS address on the third phy;
record the host phy SAS address in the lookup table;
search for a matching SAS address;
determine whether grouping the first phy and the third phy would exceed a maximum phy auto wide port configuration mode setting;
establish a wide port with the first phy and the third phy; and
transmit an updated identify frame to the host device.

7. The data storage device of claim 1, wherein the non-transitory computer readable storage medium contains instructions when executed by the controller cause the controller to:
determine that the host phy address received on the third phy matches the host phy address received on the first phy.

8. The data storage device of claim 1, wherein the non-transitory computer readable storage medium contains instructions when executed by the controller cause the controller to:

complete a link reset on the first phy prior to receiving the host phy SAS address on the second phy.

9. The data storage device of claim 8, wherein the non-transitory computer readable storage medium contains instructions when executed by the controller cause the controller to:

complete a link reset on the second phy prior to receiving the host phy SAS address on the third phy.

10. The data storage device of claim 1, wherein the non-transitory computer readable storage medium contains instructions when executed by the controller cause the controller to:

receive a maximum phy auto wide port configuration mode setting.

11. A data storage device, comprising:
a controller configured to receive an identify frame from a host device, wherein the identify frame includes a SAS address and a phy identifier;
a first phy;
a second phy; and
a non-transitory computer readable storage medium containing instructions when executed by the controller cause the controller to:
search a phy SAS address lookup table for a matching received host SAS address;
determine whether grouping the first phy and the second phy would exceed a maximum phy auto wide port configuration mode setting;
configure the first phy and the second phy into a wide port; and
transmit target identify frame to the host device.

12. The data storage device of claim 11, wherein the maximum phy auto wide port configuration mode setting is four phys for a wide port.

13. The data storage device of claim 11, wherein the maximum phy auto wide port configuration mode setting is two phys for a wide port.

14. The data storage device of claim 11, wherein the non-transitory computer readable storage medium containing instructions when executed by the controller cause the controller to:

reconfigure phy port mappings.

15. The data storage device of claim 11, wherein the non-transitory computer readable storage medium containing instructions when executed by the controller cause the controller to:

store a last target phy SAS address persistently in non-volatile memory.

16. The data storage device of claim 11, wherein the non-transitory computer readable storage medium containing instructions when executed by the controller cause the controller to:

automatically reconfigure the first phy and the second phy into a wide port configuration the same SAS target addresses independent of an order that the first phy and the second phy complete SAS link reset sequences.

17. The data storage device of claim 11, wherein the non-transitory computer readable storage medium containing instructions when executed by the controller cause the controller to:

use a default phy SAS address to configure the first phy and the second phy if the maximum phy auto wide port configuration mode setting is reached.

18. The data storage device of claim 11, wherein the non-transitory computer readable storage medium containing instructions when executed by the controller cause the controller to:

store addresses used in identify frames in non-volatile memory.

19. The data storage device of claim 11, wherein the non-transitory computer readable storage medium containing instructions when executed by the controller cause the controller to:

wait to receive host identify frames.

20. The data storage device of claim 11, wherein the non-transitory computer readable storage medium containing instructions when executed by the controller cause the controller to:

transmit a target identify frame to the host device if no host identify frame is received.

* * * * *